March 14, 1967 A. H. ASHLEY ETAL 3,309,538

SENSITIVE SENSE AMPLIFIER CIRCUITS CAPABLE OF DISCRIMINATING MARGINAL-LEVEL INFO-SIGNALS FROM NOISE YET UNAFFECTED BY PARAMETER AND TEMPERATURE VARIATIONS

Filed March 31, 1965 2 Sheets-Sheet 1

INVENTORS
MATTHEW C. ABBOTT
ALBERT H. ASHLEY

BY Spencer E. Olson

ATTORNEY

SENSITIVE SENSE AMPLIFIER CIRCUITS CAPABLE OF DISCRIMINATING MARGINAL-LEVEL INFO-SIGNALS FROM NOISE YET UNAFFECTED BY PARAMETER AND TEMPERATURE VARIATIONS

Filed March 31, 1965 2 Sheets-Sheet 2

INVENTORS
MATTHEW C. ABBOTT
ALBERT H. ASHLEY
BY Spencer E. Olson
ATTORNEY 3,309,538

SENSITIVE SENSE AMPLIFIER CIRCUITS CAPABLE OF DISCRIMINATING MARGINAL-LEVEL INFO-SIGNALS FROM NOISE YET UNAFFECTED BY PARAMETER AND TEMPERATURE VARIATIONS

Albert H. Ashley, Holliston, and Matthew C. Abbott, Wakefield, Mass., assignors to Sylvania Electric Products Inc., a corporation of Delaware Filed Mar. 31, 1965, Ser. No. 444,121
14 Claims. (Cl. 307—88.5)

This invention relates generally to amplifier circuits, and more particularly to improved sense amplifier circuits for detecting the output of a magnetic core memory, or for use with line receivers, where common mode signal rejection is an important requirement.

The principal function of a sense amplifier in a magnetic core memory system is to distinguish between a binary "0" signal output and a binary "1" signal output from a selected memory core, and to amplify a detected binary "1" signal output to a level sufficient to set a flip-flop in the output circuit. The amplifier must be able to reject a noisy "0" signal, yet accept a low level "1" signal of either of two polarities where bipolar sensing is required. There must, in addition, be a common mode rejection of received signals of the same polarity or mode, which signals may have been inadvertently induced into the memory core output windings. The sense amplifier performs essentially the same functions when used in conjunction with a line receiver, except that the received signals have a greater amplitude, requiring less amplification.

A sense amplifier is essentially a three stage amplifier circuit of which the input stage is a balanced difference amplifier employing a constant current source to supply the emitters of a pair of balanced transistors, thereby performing the aforementioned common mode rejection. The second stage of the amplifier discriminates between a noisy "0" input signal and a low level "1" input signal, and in conjunction with the third stage, operates as a pulse shaper and gate. The primary requirement of the sense amplifier is to set and maintain a relatively constant rejection level, below which any received signal is treated as a binary "0" signal and rejected, and above which any received signal is treated as a binary "1" signal and passed.

One disadvantage of currently available sense amplifier circuits is that they require the use of precision resistors to establish the desired discrimination level. Furthermore, it has been found that variations in supply voltages, the aging of circuit components, or a combination of the two, causes wide variations in this critical discrimination level. A typical prior art sense amplifier, shown in FIG. 2 of U.S. Patent No. 3,122,650, is not subject to changes in the discrimination level due to variations in the supply voltages, but requires relatively elaborate biasing means to provide the necessary stability. Also, the circuit discrimination level varies substantially as the circuit components age or as the ambient temperature changes.

It is, therefore, a principal object of this invention to provide a sense amplifier which maintains a constant discrimination level despite the aging of circuit components.

Another object of the invention is to provide a sense amplifier which maintains a constant discrimination level despite changes in the circuit supply voltages or changes in the ambient temperature to which the circuit is subjected.

These and other related objects are accomplished in illustrative embodiments of the invention to be described by employing an improved biasing means by which the discrimination level is set in accordance with the ratio of the resistance values of discrete resistive circuit components, and thus relatively independent of the absolute values of these components. The biasing means is arranged to compensate for the change in the gain of the active circuit components due to changes in supply voltages. Thus, while the absolute values of the resistive components may vary over a given temperature range, or as the components age, they tend to change uniformly, with their ratios remaining relatively constant, thereby maintaining a relatively constant discrimination level.

Other objects, features and advantages of the invention will become apparent from the following detailed description and reference to the accompanying drawings, in which:

FIGS. 3A and 3B are schematic circuit diagrams of alternate connections for the sense amplifier of FIG. 3.

Figure 1:
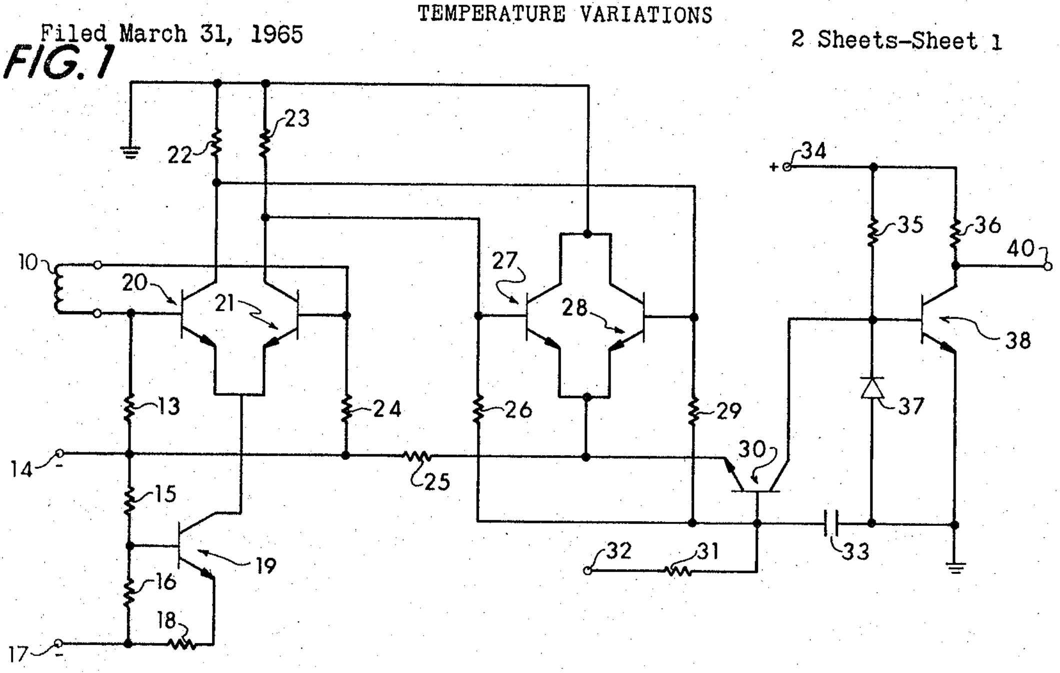
FIG. 1 is a schematic circuit diagram of a sense amplifiers according to the invention.

The input circuit of the sense amplifier of FIG. 1 is a balanced difference amplifier including a pair of matched input transistors 20 and 21. The bipolar outputs from the memory core sense winding 10 are applied to the base electrodes of transistors 20 and 21, which are connected via resistors 13 and 24, respectively, to a source of negative potential represented by terminal 14. The emitter electrodes of transistors 20 and 21 are connected together and to the collector electrode of a transistor 19, which operates as a constant current source. A resistor divider network consisting of resistors 15 and 16 is connected between the source 14 of negative potential and a second source of negative potential represented by terminal 17, with the junction of the two resistors connected directly to the base electrode of transistor 19. The emitter electrode of transistor 19 is connected via resistor 18 to the source 17 of negative potential.

The collector electrodes of transistors 20 and 21 are connected via resistors 22 and 23, respectively, to a point of reference potential, ground in this case, and are directly connected to the base electrodes of transistors 27 and 28, respectively, of the second stage. The collector electrodes of transistors 27 and 28 are both connected to ground, and their emitter electrodes are connected directly to the emitter electrode of a transistor 30. The base electrodes of transistors 27 and 28 are connected through resistors 26 and 29, respectively, to the base electrode of transistor 30. A resistor 31 is connected between the base electrode of transistor 30 and a terminal 32, and a capacitor 33 is connected between the base electrode of transistor 30 and the point of reference potential. A resistor 25 is connected between the emitter electrode of transistor 30 and the source of negative potential represented by terminal 14.

The collector electrode of transistor 30 is directly connected to the base electrode of a transistor 38, the emitter of which is connected directly to ground, and a diode 37 is connected between the emitter and base electrodes of transistor 38. Resistors 35 and 36 are connected between a source of positive potential, represented by terminal 34, and the base and collector electrodes, respectively, of transistor 38.

In operation, the first stage of the circuit of FIG. 1 operates as a Class A balanced difference amplifier. Signals of opposite polarity from the memory core sense winding 10 applied to the base electrodes of transistors 20 and 21, are linearly amplified. The constant current transistor 19 and its associated circuitry, regulates the current through transistors 20 and 21 so that the total current through them remains constant, even though one may be conducting more heavily than the other.

In the second stage of the sense amplifier, transistors 27 and 28 are normally biased off and a predetermined minimum signal voltage is required to cause either transistor to go into conduction. Since the signal voltages applied to the base electrodes of transistors 27 and 28 are equal in magnitude, but of opposite polarity, only one of these transistors goes into conduction; that is, the transistor which has a positive signal voltage applied to its base electrode goes into conduction, the other transistor remaining non-conducting. When one of the transistors goes into conduction, the potential at the emitter electrode of transistor 30 goes positive with respect to its quiescent condition; i.e., approaches ground potential, but the potential at the base electrode of transistor 30 remains constant, since the currents through resistors 26 and 29 are equal in magnitude, but of opposite polarity.

In a typical application of the circuit, terminal 32 is connected to ground and transistor 30 is normally conducting. The collector current for transistor 30 is derived in part through resistor 35 and in part through diode 37. In addition, diode 37 acts to keep transistor 30 conducting in the active region; that is, it prevents the transistor from going into saturation. Capacitor 33 provides a low impedance to signal frequencies reflected back into the emitter circuit of transistor 30, thereby stabilizing the amplifier threshold level. As the emitter electrode of transistor 30 swings positive due to the conduction of transistor 27, or transistor 28, transistor 30 conducts less heavily, thereby diminishing the current through diode 37. If the conduction through transistor 30 is sufficiently reduced, diode 37 is back-biased and base current becomes available to transistor 38 and drives normally non-conducting transistor 38 into conduction, causing the potential at output terminal 40 to go negative; that is, to approach ground potential.

In this circuit, transistors 20 and 21 are specified to be balanced within two millivolts $V_{be}$. The collector voltages of these transistors are proportional to their collector current and the value of the collector load resistors 22 and 23. The discrimination level is determined by the current through resistors 26, 29 and 31, and under normal variations of supply voltages and temperature is independent of all parameters affecting the bias level of transistors 20 and 21. Since the signal voltages at the base electrodes of transistors 27 and 28 are equal in magnitude, but opposite in polarity, the signal does not affect the average voltage at the base of transistor 30. Therefore, by choosing resistors 26, 29 and 31 properly, the discrimination level does not vary so long as the ratio of these resistors is constant, even though the absolute values of these resistors may change. As in prior art amplifiers, transistors 27, 28 and 30 tend to compensate themselves with changes in temperature.

The circuit of FIG. 1 has been shown to maintain a constant discrimination level of approximately forty millivolts, when the following values of circuit components were used:

| | | |
|---|---|---|
| Transistors **20, 21, 19, 27, 38, 30, 38** | | 2N708 |
| Diode **37** | | 1N914 |
| Resistor **18** | ohms | 3.3K |
| Resistors **16, 26, 29** | do | 12K |
| Resistor **15** | do | 6.8K |
| Resistors **13, 24** | do | 120 |
| Resistor **31** | do | 15K |
| Resistors **22, 23, 36** | do | 3.9K |
| Resistor **35** | do | 4.7K |
| Capacitor **33** | pfd | 220 |
| Potential at terminal **14** | volts | −12 |
| Potential at terminal **17** | do | −25 |
| Potential at terminal **34** | do | +5 |
| Potential at terminal **32** | | Gnd. |

Figure 2:
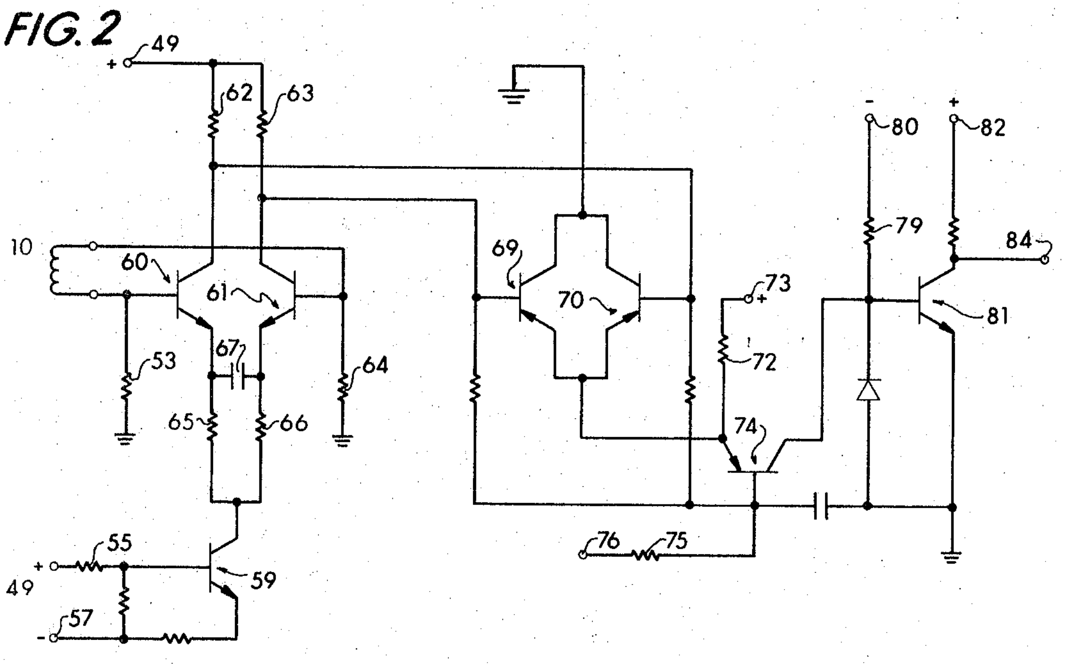
FIG. 2 is a schematic circuit diagram of an alternative sense amplifier according to the invention.

The sense amplifier of FIG. 2 is a modification of the circuit of FIG. 1, utilizing PNP transistors instead of NPN transistors in the discrimination and gating stages, and illustrating further modifications which may be made in the circuit of FIG. 1. In this circuit, the collector electrodes of the input transistors 60 and 61 are connected via resistors 62 and 63, respectively, to a source of positive potential represented by terminal 49, and resistors 53 and 64 are connected between the base electrodes of transistors 60 and 61, respectively, and a point of reference potential shown as ground. Resistors 65 and 66 are connected between the emitter electrodes of transistors 60 and 61, respectively, and the collector electrode of the constant current source transistor 59 with a capacitor 67 connected between the emitter electrodes of transistors 60 and 61. The use of this RC network in the emitter stage of the input circuit permits the use of unbalanced transistors in the balanced difference amplifier.

The outputs from the collector electrodes of transistors 60 and 61 are directly connected to the base electrodes of PNP transistors 69 and 70, respectively, and the emitter electrodes of transistors 69 and 70 are directly connected to the emitter electrode of PNP transistor 74. A resistor 72 is connected between the emitter electrode of transistor 74 and a source of positive potential represented by terminal 73. The collector electrode of transistor 74 is directly connected to the base electrode of transistor 81, and a resistor 79 is connected between this base electrode and a source of negative potential represented by terminal 80.

The operation of the circuit of FIG. 2 resembles that of the circuit of FIG. 1, except that the polarity of the output signal is reversed. Transistor 81 is normally conducting, whereas corresponding transistor 38 in the circuit of FIG. 1 is normally non-conducting. In the circuit of FIG. 2, when a signal voltage is applied to the emitter electrode of transistor 74, the current through this transistor is diminished, thereby reducing the drive current to the base electrode of transistor 81 sufficiently to cut transistor 81 off. With transistor 81 cut off, the potential at output terminal 84 approaches that of positive source of potential represented by terminal 82.

The use of the PNP transistors in the discrimination and gating stages of the FIG. 2 circuit permits the biasing of the input difference amplifier at ground potential. Therefore, in the quiescent state, the base electrodes of transistors 60 and 61 are at ground potential, and the memory core sense winding 10 is also biased at ground. When this circuit is used to sense the output from a line receiver, rather than a memory core, it is often desirable to have the input terminals biased about ground.

Figure 3:
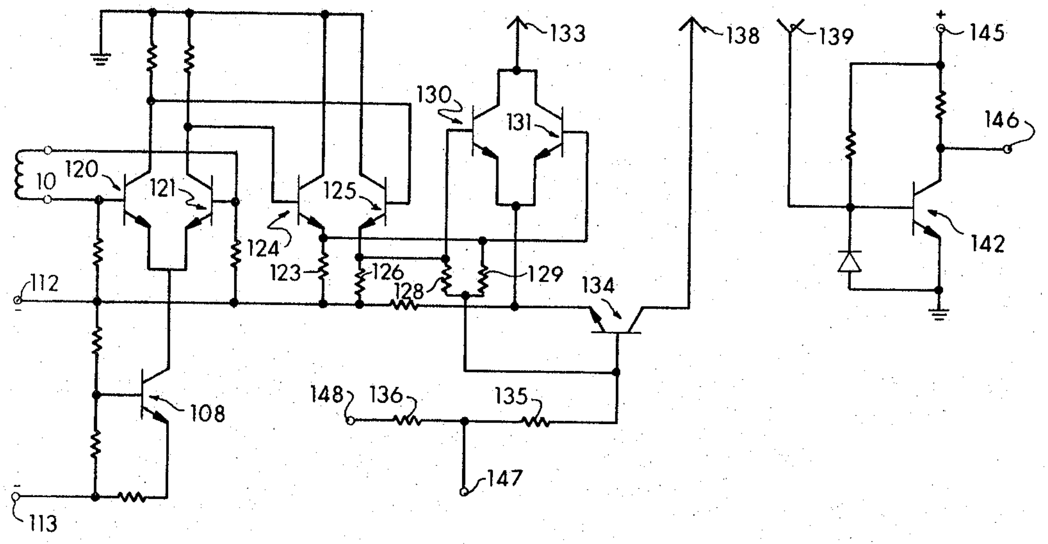
FIG. 3 is a schematic circuit diagram of still another form of sense amplifier embodying the invention.

The sense amplifier of FIG. 3 will be recognized as the sense amplifier of FIG. 1 with a pair of emitter follower circuits connected between the difference amplifier and discrimination stages. The collector electrodes of transistors 120 and 121 are connected directly to the base electrode s of transistors 124 and 125, respectively, which are connected in a common collector configuration and biased class A. Resistors 123 and 126 are connected between the emitter electrodes of transistors 124 and 125, respectively, and a source of negative potential represented by terminal 112. The emitter electrodes of transistors 124 and 125 are connected directly to the base electrodes of transistors 130 and 131, respectively. Resistors 135 and 136 are connected in series between the base electrode of transistor 134 and terminal 148 with a second terminal 147 connected directly to the junction of resistors 135 and 136. This provides a choice of discrimination levels by placing the appropriate reference potential at either of terminals 147 or 148.

The use of the common collector stages permits a substantial reduction in the size of resistors 128, 129 and 135, reducing the signal impedance into the emitter circuit of transistor 134 sufficiently to obviate the need for a capacitor in the base circuit of transistor 134. These features are highly desirable if the amplifier is to be fabricated in monolithic form, since it is difficult to produce capacitors and high values of resistance by monolithic techniques. A further advantage is the reduction in the gain requirement of transistor 134. In the amplifier of FIG. 1, where the common collector stages are not used, transistor 30 must have a current gain of approximately fifty, whereas in the amplifier of FIG. 3, a transistor current gain of twenty is adequate for transistor 134, because of the current gain afforded by the emitter followers.

Figure 3A:
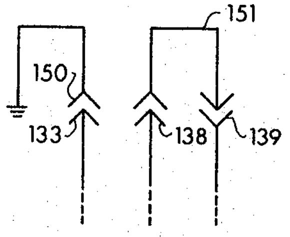
Figure 3A:
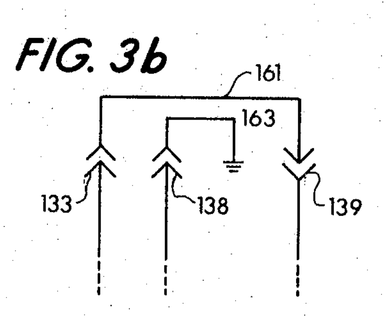

FIG. 3A and FIG. 3B depict two suggested ways for connecting the discrimination and gating stages of the sense amplifier of FIG. 3 to the output stage of the amplifier. In the alternative shown in FIG. 3A, the collector electrode of transistor 134 is connected directly to the base electrode of the output transistor 142 and the collector electrodes of transistors 130 and 131 are connected directly to ground. With these connections, the sense amplifier of FIG. 3 is operationally the same as the circuit of FIG. 1 except for the addition of the common collector stages.

In the other alternative, shown in FIG. 3B, the collector electrodes of transistors 130 and 131 are directly connected to the base electrode of transistor 142, and the collector electrode of transistor 134 is connected to ground. With these connections, transistor 142 is normally conducting, since transistors 130 and 131 are normally nonconducting, and the quiescent output at terminal 146 is at approximately ground potential. However, when a signal is applied to the base electrode of transistor 130 or 131, causing one of these transistors to go into conduction, base drive current is removed from transistor 142, thereby cutting it off, causing the potential at the output terminal 146 to approach the potential of the positive source represented by terminal 145. If the circuit is to be fabricated in monolithic form by providing alternate connections as shown in FIGS. 3A and 3B, the user of the circuit is allowed to choose the type of output signal pulse most suitable to his particular needs.

From the foregoing description, it is apparent that the invention provides an improved sense amplifier possessing stabilized discrimination characteristics which are unaffected by changes in temperature or operating voltage. The amplifier has the further advantage that only changes in the ratio of the biasing resistors affect changes in the discrimination level; thus, if the biasing resistors are of the same construction so as to change in a similar manner with age and use, the ratio remains constant.

While a number of modifications of the amplifier have been suggested, it will be apparent that many other variations may be made by ones skilled in the art without departing from the spirit of the invention. It is therefore intended that the invention not be limited to the specifics of the foregoing description, but rather to embrace the full scope of the following claims.

What is claimed is:

1. A sense amplifier circuit comprising:
- a balanced difference amplifier having first and second input terminals adapted to receive bipolar signals, and first and second output terminals;
- a discrimination stage having first and second input terminals and first and second output terminals;
- means connecting the first and second output terminals of said balanced difference amplifier to the first and second input terminals, respectively, of said discrimination stage;
- a gating amplifier having first and second input terminals and an output terminal;
- means connecting the first and second output terminals of said discrimination stage directly to the first input terminal of said gating amplifier;
- first and second resistors respectively connected between the first and second input terminals of said discrimination stage and the second input terminal of said gating amplifier; and
- a third resistor connected between the second input terminal of said gating amplifier and a point of reference potential, said first, second and third resistors being operative to establish the discrimination level of said sense amplifier circuit, said discrimination level being proportional to the ratio of the resistance values of said first, second and third resistors and independent of the absolute values of said resistors.

2. The sense amplifier circuit according to claim 1, additionally comprising:
- an output stage having an input terminal and an output terminal; and
- means connecting the output terminal of said gating amplifier to the input terminal of said output stage.

3. The sense amplifier circuit according to claim 1, wherein said means connecting the first and second output terminals of said balanced difference amplifier to the first and second input terminals, respectively, of said discrimination stage comprise:
- an emitter follower stage having first and second input terminals and first and second output terminals;
- means directly connecting the first and second output terminals of said balanced difference amplifier to the first and second input terminals, respectively, of said emitter follower stage; and
- means directly connecting the first and second output terminals of said emitter follower stage to the first and second input terminals, respectively, of said discrimination stage.

4. A sense amplifier circuit comprising:
- a balanced difference amplifier having first and second input terminals adapted to receive bipolar signals, and first and second output terminals;
- a discrimination stage comprising first and second transistors each having base, emitter and collector electrodes;
- means connecting the first and second output terminals of said balanced difference amplifier to the base electrodes of said first and second transistors, respectively, in said discrimination stage;
- a first and a second source of electrical potential;
- a gating amplifier comprising a transistor having base, emitter and collector electrodes, a resistor connected between the base electrode of said transistor and a point of reference potential, and means connecting the emitter electrode of said transistor to first source of electrical potential;
- means connecting the emitter electrodes of said first and second transistors in said discrimination stage to the emitter electrode of said transistor of said gating amplifier;
- means connecting the collector electrodes of said first and second transistors in said discrimination stage to said second source of electrical potential; and
- first and second resistors respectively connected between the base electrodes of said first and second transistors in said discrimination stage and the base electrode of said transistor in said gating amplifier.

5. The sense amplifier circuit according to claim 4, additionally comprising:
- a capacitor connected between the base electrode of said gating amplifier transistor and a point of ground potential.

6. The sense amplifier circuit according to claim 4 wherein said first source of electrical potential is a source of negative electrical potential; said second source of electrical potential is ground; and said first and second discrimination stage transistors and said amplifier stage transistor are NPN transistors.

7. The sense amplifier circuit according to claim 4, wherein said first source of electrical potential is a source of positive electrical potential; said second source of electrical potential is a second source of positive electrical potential; and said first and second discrimination stage transistors and said gating amplifier transistor are PNP transistors.

8. The sense amplifier circuit according to claim 6, additionally comprising:

an output terminal;

an output stage comprising a transistor having base, emitter and collector electrodes, a source of positive electrical potential, first and second resistors connected between said source of positive electrical potential and the base and collector electrodes, respectively, of said output stage transistor, a diode connected between the base and emitter electrodes of said output stage transistor, and means connecting the emitter electrode of said transistor directly to a point of ground potential;

means connecting said collector electrode of said output stage transistor to said output terminal; and means connecting the collector electrode of said gating amplifier transistor to the base electrode of said output stage transistor.

9. The sense amplifier circuit according to claim 7 additionally comprising:

an output terminal;

an output stage comprising a transistor having base, emitter and collector electrodes, a source of negative electrical potential, a third source of positive electrical potential, a first resistor connected between said source of negative potential and the base electrode of said transistor, a second resistor connected between said third source of positive electrical potential and the collector electrode of said transistor, a diode connected between the base and emitter electrodes of said transistor, and means connecting the emitter electrode of said transistor directly to a point of ground potential;

means connecting the collector electrode of said gating amplifier transistor to the base electrode of said output stage transistor; and means connecting the collector electrode of said output stage transistor to said output terminal.

10. A sense amplifier circuit comprising:

a first and second source of negative electrical potential;

first and second input terminals adapted to receive bipolar signals;

a balance difference amplifier comprising first, second and third transistors each having base, emitter and collector electrodes, means connecting the base electrodes of said first and second transistors to said first and second input terminals, respectively, first and second resistors connected between the collector electrodes, respectively, of said first and second transistors and a point of ground potential, third and fourth resistors connected between the base electrodes, respectively, of said first and second transistors and said first source of negative electrical potential, a fifth resistor connected between the base electrode of said third transistor and said first source of negative electrical potential, sixth and seventh resistors connected between the base and emitter electrodes, respectively, of said third transistor and said second source of negative electrical potential, and means connecting the emitter electrodes of said first and second transistors to the collector electrode of said third transistor;

a discrimination stage comprising first, and second transistors each having base, emitter and collector electrodes, and means connecting the collector electrodes of said first and second transistors to a point of ground potential;

means respectively directly connecting the collector electrodes of said first and second balanced difference amplifier transistors to the base electrodes of said first and second discrimination stage transistors;

a gating amplifier comprising a transistor having base, emitter and collector electrodes, and a resistor connected between the emitter electrode of said transistor and said first source of negative electrical potential;

a biasing network comprising first and second resistors respectively connected between the base electrodes of said first and second discrimination stage transistors and the base electrode of said gating amplifier transistor and a third resistor connected between the base electrode of said gating amplifier transistor and a point of reference potential;

means directly connecting the emitter electrodes of said first and second discrimination stage transistors to the emitter electrode of said gating amplifier transistor;

an output terminal;

an output stage comprising a transistor having base, emitter and collector electrodes, a source of positive electrical potential, first and second resistors respectively connected between the base and collector electrodes of said transistor and said source of positive electrical potential, a direct connection between the emitter electrode of said transistor and ground, and a diode connected between the base and emitter electrodes of said transistor;

means connecting the collector electrode of said gating amplifier transistor to the base electrode of said output stage transistor; and means connecting the collector electrode of said output stage ransistor to said output terminal.

11. A sense amplifier circuit comprising:

first and second input terminals adapted to receive bipolar input signals;

a source of positive electrical potential;

a balanced difference amplifier comprising first, second and third transistors, each having base, emitter and collector electrodes, means connecting the base electrodes of said first and second transistors to said first and second input terminals, respectively, a source of negative electrical potential, first and second resistors connected respectively between the collector electrodes of said first and second transistors and said source of positive electrical potential, third and fourth resistors connected between the base electrodes of said first and second transistors, respectively, and a point of ground potential, fifth and sixth resistors connected between the emitter electrodes of said first and second transistors, respectively, and the collector electrode of said third transistor, seventh and eighth resistors connected between the base and emitter electrodes, respectively, of said third transistor and said source of negative electrical potential, a ninth resistor connected between the base electrode of said third transistor and said source of positive potential, and a capacitor connected between the emitter electrodes of said first and second transistors;

a discrimination stage comprising first and second transistors each having base, emitter and collector electrodes, and means connecting the collector electrodes of said first and second transistors to a source of ground potential;

means respectively connecting the collector electrodes of said first and second balanced difference amplifier transistors to the base electrodes of said first and second discrimination stage transistors;

a gating amplifier comprising a transistor having base, emitter and collector electrodes, a source of positive electrical potential, and a resistor connected between said source of positive electrical potential and the emitter electrode of said transistor;

a biasing network comprising first and second resistors respectively connected between the base electrodes of said first and second discrimination stage transistor and the base electrode of said gating amplifier transistor, and a third resistor connected between the base electrode of said gating amplifier transistor and a point of reference potential;

means directly connecting the emitter electrodes of said first and second discrimination amplifier transistors to the emitter electrode of said gating amplifier transistor;

an output terminal;

an output stage comprising a transistor having base, emitter and collector electrodes, a source of negative electrical potential, a source of positive electrical potential, a first resistor connected between the base electrode of said transistor and said source of negative electrical potential, a second resistor connected between the collector electrode of said transistor and said source of positive electrical potential, a direct connection between the emitter electrode of said transistor and ground, and a diode connected between the base and emitter electrodes of said transistor;

means connecting the collector electrode of said gating amplifier transistor to the base electrode of said output stage transistor; and means connecting the collector electrode of said output stage transistor to said output terminal.

12. A sense amplifier circuit comprising:

first and second sources of negative electrical potential;

a balanced difference amplifier comprising first, second and third transistors each having base, emitter and collector electrodes, first and second resistors connected between the collector electrodes of said first and second transistors and a point of ground potential, third and fourth resistors respectively connected between the base electrodes of said first and second transistors and said first source of negative electrical potential, means directly connecting the emitter electrodes of said first and second transistors to the collector electrode of said third transistor, fifth and sixth resistors respectively connected between the base and emitter electrodes of said third transistor and said second source of negative electrical potential, and a seventh resistor connected between the base electrode of said third transistor and said first source of negative electrical potential;

an emitter follower stage comprising first and second transistors each having base, emitter and collector electrodes, means connecting the collector electrodes of said first and second transistors directly to a point of ground potential, and first and second resistors respectively connected between the emitter electrodes of said first and second transistors and said first source of negative electrical potential;

means respectively connecting the collector electrodes of said first and second balanced difference amplifier transistors to the base electrodes of said first and second emitter follower stage transistors;

a discrimination stage comprising first and second transistors each having base, emitter and collector electrodes, and an output terminal connected directly to the collector electrodes of said first and second transistors;

a gating amplifier comprising a transistor having base, emitter and collector electrodes, a resistor connected between the emitter electrode of said transistor and said first source of negative electrical potential, and an output terminal connected to the collector electrode of said transistor;

means directly connecting the emitter electrodes of said first and second discrimination stage transistors to the emitter electrode of said gating amplifier transistor; and a biasing network comprising first and second resistors respectively connected between the base electrodes of said first and second discrimination stage transistors and the base electrode of said gating amplifier transistor, third and fourth resistors connected in series between the base electrode of said gating amplifier transistor and a point of reference potential; and a terminal connected to the junction of said third and fourth resistors.

13. The sense amplifier circuit according to claim 12, additionally comprising:

an output stage comprising a transistor having base, emitter and collector electrodes, a source of positive electrical potential, first and second resistors respectively connected between the base and collector electrodes of said transistor and said source of positive electrical potential, means connecting the emitter electrode of said transistor to ground, a diode connected between the base and emitter electrodes of said transistor, and an output terminal connected to the collector electrode of said transistor;

means connecting the output terminal of said discrimination stage to a point of ground potential; and means connecting the output terminal of said gating amplifier to the base electrode of said output stage transistor.

14. The sense amplifier circuit according to claim 12, additionally comprising:

an output stage comprising a transistor having base, emitter and collector electrodes, a source of positive electrical potential, first and second resistors respectively connected between the base and collector electrodes of said transistor and said source of positive electrical potential, means connecting the emitter electrode of said transistor to ground, a diode connected between the base and emitter electrodes of said transistor, and an output terminal connected to the collector electrode of said transistor;

means connecting the output terminal of said gating amplifier to a point of ground potential; and means connecting the output terminal of said discrimination stage directly to the base electrode of said output stage transistor.

References Cited by the Examiner

UNITED STATES PATENTS

| | | | |
|---|---|---|---|
| 3,164,754 | 1/1965 | Garland et al. | 307—88.5 |
| 3,170,125 | 2/1965 | Thompson | 307—88.5 |

ARTHUR GAUSS, *Primary Examiner.*

J. S. HEYMAN, *Assistant Examiner.*